United States Patent
Seto et al.

(10) Patent No.: US 10,451,507 B2
(45) Date of Patent: Oct. 22, 2019

(54) PRESSURE SENSOR

(71) Applicant: Azbil Corporation, Tokyo (JP)

(72) Inventors: Yuki Seto, Tokyo (JP); Rina Ogasawara, Tokyo (JP)

(73) Assignee: Azbil Corporation, Tokyo (JP)

( * ) Notice: Subject to any disclaimer, the term of this patent is extended or adjusted under 35 U.S.C. 154(b) by 239 days.

(21) Appl. No.: 15/638,734

(22) Filed: Jun. 30, 2017

(65) Prior Publication Data

US 2018/0010975 A1 Jan. 11, 2018

(30) Foreign Application Priority Data

Jul. 8, 2016 (JP) ................................ 2016-135894

(51) Int. Cl.
*G01L 13/02* (2006.01)
*G01L 9/00* (2006.01)
*G01L 19/14* (2006.01)

(52) U.S. Cl.
CPC .......... *G01L 9/0055* (2013.01); *G01L 9/0052* (2013.01); *G01L 13/025* (2013.01); *G01L 19/147* (2013.01)

(58) Field of Classification Search
CPC ... G01L 9/0052; G01L 9/0055; G01L 13/025; G01L 19/147
See application file for complete search history.

(56) References Cited

U.S. PATENT DOCUMENTS

| | | | | |
|---|---|---|---|---|
| 6,308,577 B1 * | 10/2001 | Baskett | ................. | G01L 1/2275 73/766 |
| 6,655,216 B1 * | 12/2003 | Aizawa | ................... | G01L 9/006 73/700 |
| 7,192,819 B1 * | 3/2007 | Padmanabhan | ..... | B81C 1/00158 257/19 |
| 2001/0039837 A1 * | 11/2001 | Tanizawa | .............. | G01L 9/0055 73/715 |
| 2004/0255682 A1 * | 12/2004 | Petrova | ................. | G01L 9/0055 73/715 |

(Continued)

FOREIGN PATENT DOCUMENTS

| DE | 102013114728 A1 | 7/2015 |
|---|---|---|
| JP | S63217671 A | 9/1988 |
| JP | 2004045140 A | 2/2004 |

OTHER PUBLICATIONS

European Patent Office, "Extended European Search Report," issued in European Patent Application No. 17 180 311.7, which is a European Counterpart of U.S. Appl. No. 15/638,734 dated Nov. 20, 2017, 8 page.

*Primary Examiner* — Natalie Huls
(74) *Attorney, Agent, or Firm* — Amster, Rothstein & Ebenstein LLP

(57) ABSTRACT

To suppress variations in the shift amount of the zero point of a sensor output when a pipe is connected to a pressure sensor via a clamp. A pressure sensor includes two semiconductor chips in two straight lines, orthogonal to each other, that pass through a center of a diaphragm in plan view, two resistors in the region between two supporting members supporting one semiconductor chip, and two other resistors in the region between two other supporting members supporting the other semiconductor chip.

8 Claims, 13 Drawing Sheets
(2 of 13 Drawing Sheet(s) Filed in Color)

(56) References Cited

U.S. PATENT DOCUMENTS

| | | | |
|---|---|---|---|
| 2006/0144153 A1* | 7/2006 | Brosh | G01L 9/0052 |
| | | | 73/715 |
| 2007/0151348 A1* | 7/2007 | Zdeblick | G01L 9/045 |
| | | | 73/708 |
| 2007/0227254 A1* | 10/2007 | Nagasawa | G01L 9/006 |
| | | | 73/724 |
| 2007/0277616 A1* | 12/2007 | Nikkei | G01L 9/0052 |
| | | | 73/715 |
| 2008/0041164 A1* | 2/2008 | Cottles | G01L 27/007 |
| | | | 73/726 |
| 2008/0047354 A1* | 2/2008 | Otsuka | G01L 9/0055 |
| | | | 73/767 |
| 2015/0114129 A1* | 4/2015 | Chen | G01L 9/0052 |
| | | | 73/721 |
| 2015/0338293 A1* | 11/2015 | Masunishi | G01L 1/22 |
| | | | 73/649 |
| 2015/0362391 A1* | 12/2015 | Suzuki | G01L 9/0044 |
| | | | 137/511 |
| 2017/0307457 A1* | 10/2017 | Zwijze | G01L 9/0051 |
| 2018/0010976 A1* | 1/2018 | Seto | G01L 9/0055 |
| 2018/0136062 A1* | 5/2018 | Zheng | G01L 9/0051 |
| 2019/0003910 A1* | 1/2019 | Seto | G01L 9/00 |
| 2019/0025144 A1* | 1/2019 | Seto | G01L 9/00 |

* cited by examiner

PRESSURE SENSOR

CROSS-REFERENCE TO RELATED APPLICATIONS

The present application claims the benefit of and priority to Japanese Patent Application No. 2016-135894, filed on Jul. 8, 2016, the entire contents of which are incorporated by reference herein.

TECHNICAL FIELD

The present invention relates to a pressure sensor and, for example, to a sanitary pressure sensor.

BACKGROUND

Generally, it is necessary to meet strict conditions, such as corrosive resistance, cleanness, reliability, and versatility, for a pressure sensor for detecting the pressure of a fluid to be permitted as a sanitary pressure sensor that needs consideration to sanitation used in production sites for food, drugs, and the like.

For example, to ensure corrosive resistance, a sanitary pressure sensor needs to include a material having high corrosive resistance, such as stainless steel (SUS), ceramic, or titanium, in the wetted part in contact with a measurement target fluid (for example, liquid) for the pressure. In addition, to ensure cleanness, a sanitary pressure sensor needs to have a flash diaphragm structure that enables easy cleaning and high heat and impact resistance against steam cleaning. In addition, to ensure reliability, a sanitary pressure sensor needs to have a structure (oil free structure) that does not include encapsulant and a structure (high rigidity barrier) that makes it difficult to break a diaphragm.

Since materials and structures that can be used for a sanitary pressure sensor are restricted as compared with other pressure sensors as described above, it is difficult to improve the sensitivity. For example, to achieve a structure that makes it difficult to break a diaphragm, although the film thickness of the diaphragm needs to be increased (the aspect ratio of the diameter to the thickness of the diaphragm needs to be reduced), increase in the thickness of a diaphragm generally reduces the sensor sensitivity because the amount of deformation of a diaphragm becomes minute. Accordingly, a technique for accurately detecting minute deformation of a diaphragm is necessary for a sanitary pressure sensor.

For example, PTL 1 and PTL 2 disclose load conversion type pressure sensors that improve the sensitivity of the sensors by transmitting the displacement of only the center part of a diaphragm to a semiconductor chip (beam member) of Si, or the like, on which a strain gauge, including diffusion resistors, is formed and detecting changes in the resistance value of the diffusion resistors caused by the piezoresistive effect based on the strain of the semiconductor chip.

Specifically, in the conventional load conversion type pressure sensor disclosed in PTL 1 and PTL 2, the center part of a semiconductor chip that is rectangular in plan view is supported by the center part of a diaphragm and both ends of the semiconductor chip are fixed at a position that does not move substantially. For example, in PTL 1, the center of a strip semiconductor chip is supported by a rod-shaped member called a pivot at the center of the diaphragm and both ends in the longitudinal direction of the semiconductor chip are fixed to the thick-walled part formed at the outer peripheral edge of the diaphragm via an insulating base. In addition, in PTL 2, the center of a rectangular semiconductor chip is fixed to the center of a diaphragm and the both ends in the longitudinal direction of a semiconductor chip are fixed to a seat that does not move.

CITATION LIST

Patent Literature

[PTL 1] JP-A-2004-45140
[PTL 2] JP-A-63-217671

SUMMARY

Generally, a sanitary pressure sensor has a joint (for example, a ferrule joint) in a connection part with a pipe through which a measurement target fluid flows.

Connection between the pipe and the sanitary pressure sensor is made using a connection member called a clamp band (also referred to below as a "clamp" simply) as illustrated in FIG. 19. Specifically, as illustrated in FIG. 20, the joint for a pipe 200 and the joint for a sanitary pressure sensor 300 are disposed so as to face each other, the two joints are clamped by semicircular fixing portions 51A and 51B of a clamp 50, and the fixing portions 51A and 51B are tightened by a nut 52 (e.g., wing nut and the like), thereby making connection between the pipe 200 and the sanitary pressure sensor 300.

However, when connection between the pipe and the sanitary pressure sensor is made by the clamp, the diaphragm of the sanitary pressure sensor is deformed to no small extent, possibly shifting the zero point (offset) of a sensor output. In the case of the pressure sensor having a semiconductor chip that is rectangular in plan view, as disclosed PTL 1 and PTL 2 above, since the shift amount of the zero point by fixation of the clamp varies depending on the position of the nut for tightening the clamp, the correction of the zero point is not easy.

The invention addresses the above problems with an object of suppressing variations in the shift amount of the zero point of a sensor output when a pipe, through which a measurement target fluid flows, is connected to a pressure sensor via a clamp.

A pressure sensor (100) according to the invention includes a diaphragm (3) having a first principal surface (3A) receiving a pressure of a measurement target fluid and a second principal surface (3B) opposite to the first principal surface, a first seat (5) provided in a deformed area of the second principal surface in which the diaphragm is deformed when a pressure higher than a pressure applied in the second principal surface is applied in the first principal surface, the first seat being disposed concentrically with the diaphragm in plan view and projecting from the second principal surface orthogonally, a second seat (6) provided in the deformed area concentrically with the diaphragm in plan view and projecting from the second principal surface orthogonally, the second seat having a diameter larger than in the first seat, a first semiconductor chip (1a) having a first resistor (R1) and a second resistor (R2) on one surface thereof, the first resistor and the second resistor being included in a strain gauge, a second semiconductor chip (1b) having a third resistor (R3) and a fourth resistor (R4) on one surface thereof, the third resistor and the fourth resistor being included in the strain gauge, a first structural body (2a) provided orthogonally so that one end thereof is coupled to a part of the first seat, the part being disposed in a first straight line (21) passing through the center of the second principal surface of the diaphragm in plan view, and the other end thereof is coupled to the other surface of the first semiconductor chip, a second structural body (2b) provided orthogonally so that one end thereof is coupled to a part of the second seat, the part being disposed in the first straight line in plan view, and the other end thereof is coupled to the other surface of the first semiconductor chip, a third structural body (2c) provided orthogonally so that one end thereof is coupled to a part of the first seat, the part being disposed in a second straight line (22) passing through the center of the second principal surface and orthogonal to the first straight line in plan view and the other end thereof is coupled to the other surface of the second semiconductor chip, and a fourth structural body (2d) provided orthogonally so that one end thereof is coupled to a part of the second seat, the part being disposed in the second straight line in plan view, and the other end thereof is coupled to the other surface of the second semiconductor chip, in which the first resistor and the second resistor are formed in a region between a coupling surface to which the first structural body is coupled and a coupling surface to which the second structural body is coupled in plan view in the first semiconductor chip and the third resistor and the fourth resistor are formed in a region between a coupling surface to which the third structural body is coupled and a coupling surface to which the fourth structural body is coupled in plan view in the second semiconductor chip.

In the pressure sensor described above, preferably, the first semiconductor chip is formed in a rectangle and the first semiconductor chip is disposed so that a longer side thereof is parallel to the first straight line, the second semiconductor chip is formed in a rectangle and the second semiconductor chip is disposed so that a longer side thereof is parallel to the second straight line, the first resistor and the second resistor are disposed side by side in a direction parallel to a shorter side of the first semiconductor chip and extend in directions different from each other, the third resistor and the fourth resistor are disposed side by side in a direction parallel to a shorter side of the second semiconductor chip and extend in directions different from each other.

In the pressure sensor described above, preferably, the first resistor and the fourth resistor extend in the same direction and the second resistor and the third resistor extend in a direction orthogonal to the direction in which the first resistor and the fourth resistor extend.

In the pressure sensor described above, preferably, the first resistor, the second resistor, the third resistor, and the fourth resistor are disposed equidistantly from the center of the second principal surface of the diaphragm.

In the pressure sensor described above, preferably, the first semiconductor chip is formed in a rectangle and the first semiconductor chip is disposed so that a longer side thereof is parallel to the first straight line, the second semiconductor chip is formed in a rectangle and the second semiconductor chip is disposed so that a longer side thereof is parallel to the second straight line, the first resistor and the second resistor are disposed side by side in a direction parallel to the longer side of the first semiconductor chip, and the third resistor and the fourth resistor are disposed side by side in a direction parallel to the longer side of the second semiconductor chip.

In the pressure sensor described above, preferably, the first resistor, the second resistor, the third resistor, and the fourth resistor extend in the same direction.

In the pressure sensor described above, preferably, the first resistor and the fourth resistor are disposed equidistantly from the center of the second principal surface of the diaphragm and the second resistor and the third resistor are disposed equidistantly from the center of the second principal surface of the diaphragm.

In the pressure sensor described above, preferably, the first semiconductor chip has a first thin-walled portion (1aC) thinner than regions to which the first structural body and the second structural body are coupled, the second semiconductor chip has a second thin-walled portion (1bC) thinner than regions to which the third structural body and the fourth structural body are coupled, the first resistor and the second resistor are formed in a region on the one surface of the first semiconductor chip, the region corresponding to the first thin-walled portion, and the third resistor and the fourth resistor are formed in a region on the one surface of the second semiconductor chip, the region corresponding to the second thin-walled portion.

It should be noted that reference numerals in the drawings corresponding to components of the invention are enclosed in parentheses in the above description.

As described above, according to the invention, it is possible to suppress variations in the shift amount of the zero point of a sensor output when a pipe through which the measurement target fluid flows is connected to a pressure sensor via a clamp.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
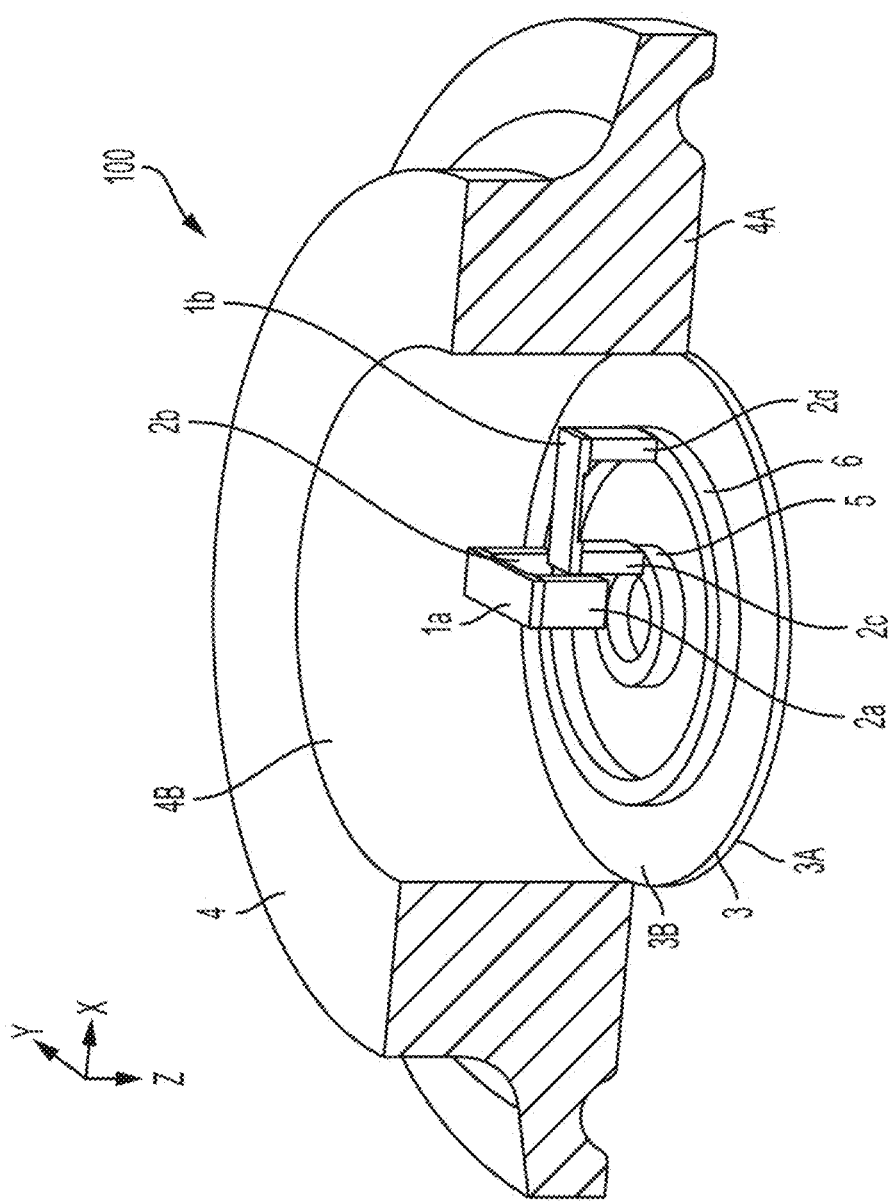
FIG. 1 is a perspective view illustrating the structure of a pressure sensor according to an embodiment of the invention.

Embodiments of the present invention will be described below with reference to the drawings. It should be noted that components common to the individual embodiments are given the same reference numerals to omit repeated descriptions.

Figure 2:
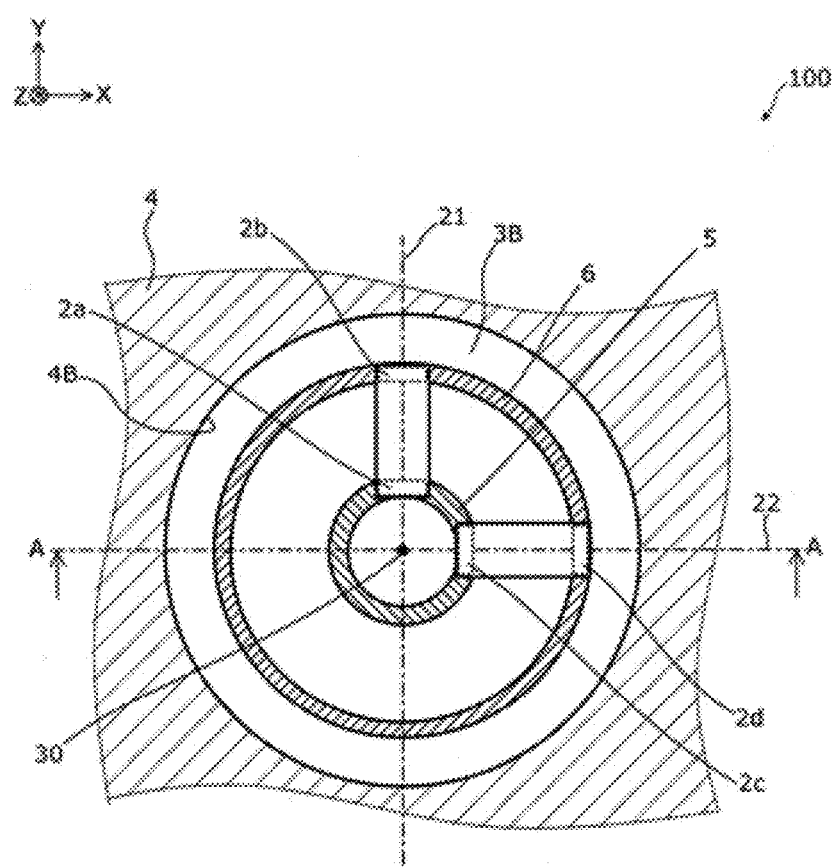
FIG. 2 is a plan view illustrating the structure of the pressure sensor according to an embodiment of the invention.
Figure 3:
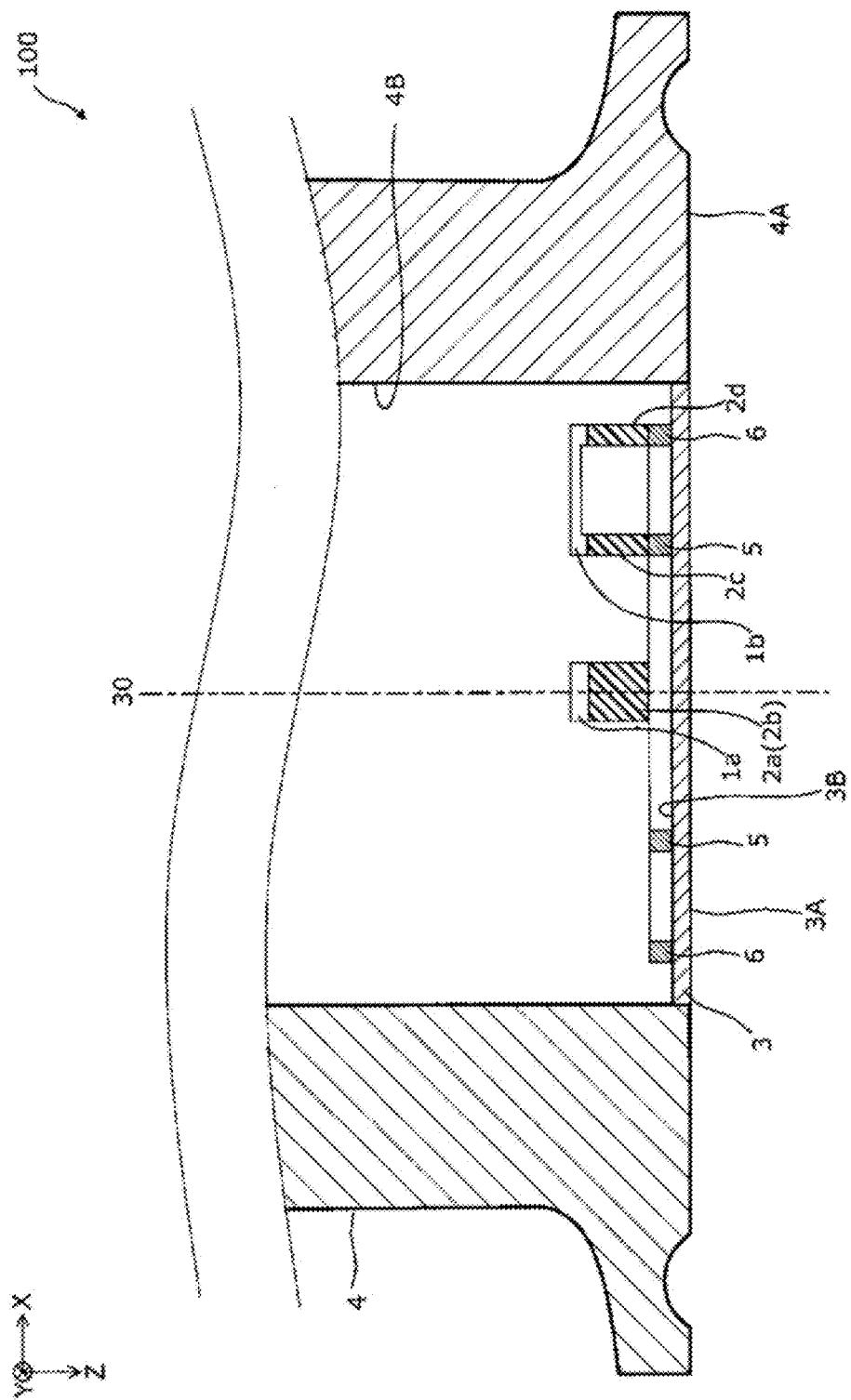
FIG. 3 is a cross-sectional view illustrating the structure of the pressure sensor according to an embodiment of the invention.

FIGS. 1 to 3 illustrate the structure of a pressure sensor according to an embodiment of the invention.

FIG. 1 is a perspective view illustrating a pressure sensor 100 according to an embodiment, FIG. 2 illustrates the planar structure of the pressure sensor 100 seen from the Z direction in FIG. 1, and FIG. 3 illustrates the cross-sectional structure of the pressure sensor 100 taken along line A-A in FIG. 2. It should be noted that a cross-sectional structure at 180 degrees is illustrated only for a housing 4 in FIG. 1.

The pressure sensor 100 illustrated in FIGS. 1 to 3 is an apparatus that detects a pressure of a measurement target fluid by transmitting, to a semiconductor chip in which a strain gauge is formed, the displacement of a diaphragm when the diaphragm is bent by the pressure of the fluid.

Specifically, the pressure sensor 100 includes two semiconductor chips 1a and 1b, supporting members 2a, 2b, 2c, and 2d, a diaphragm 3, seats 5 and 6, and the housing 4. Although not illustrated, the pressure sensor 100 may further include a displaying portion (for example, a liquid crystal display) or the like for indicating various types of information such as a detected pressure value to a user.

Although FIGS. 1 to 3 illustrate a mechanism for transmitting the bending of the diaphragm 3 in the pressure sensor 100 to the semiconductor chips 1a and 1b, they do not illustrate other functional portions, such as a circuit for processing signals output from the semiconductor chips 1a and 1b.

In addition, the directions that are orthogonal to each other and parallel to the planar direction of the diaphragm 3 may be referred to as the X axis direction and the Y axis direction and the direction orthogonal to the planar direction (X axis and Y axis) of the diaphragm 3 may be referred to as the Z axis direction.

The semiconductor chips 1a and 1b, the diaphragm 3, the seats 5 and 6, and the supporting members 2a to 2d are accommodated in the housing 4 made of a metal material having high corrosive resistance. The housing 4 is formed in a cylinder as illustrated in FIGS. 1 to 3 and one end portion 4A thereof is shaped like a joint to be connected to a pipe through which the measurement target fluid flows. The housing 4 is filled with, for example, air and the pressure close to an inner wall 4B is, for example, the atmospheric pressure.

The diaphragm 3 is a film that receives the pressure of the measurement target fluid and supports the semiconductor chips 1a and 1b and supporting members 2a-d. The diaphragm 3 is made of a material having high corrosive resistance such as, for example, stainless steel (SUS), ceramic, or titanium and is formed in, for example, a circle in plan view.

The diaphragm 3 is fixed to the part of the housing 4 close to the end portion 4A and blocks the opening part of the end portion 4A of the housing 4. For example, the outer peripheral edge of the diaphragm 3 is coupled to the part of the inner wall 4B of the housing 4 close to the end portion 4A without clearance.

One surface of the diaphragm 3 acts as a pressure receiving surface (wetted surface) 3A in contact with the measurement target fluid and the other surface acts as a supporting surface 3B for supporting the semiconductor chips 1a and 1b via the supporting members 2a to 2d. The diaphragm 3 is bent according to the pressure difference between the pressure applied from the measurement target fluid to the pressure receiving surface 3A and the pressure (for example, the atmospheric pressure) applied to the supporting surface 3B.

It should be noted that the diaphragm 3 and the housing 4 of the pressure sensor may be omitted in some of the drawings of the application for clarity of illustration of the remaining elements of the invention.

The semiconductor chip 1a is formed in a rectangle in plan view and includes a circuit board made of a semiconductor material, such as Si, and a strain gauge that has resistors R1 and R2 formed in the circuit board by a known semiconductor manufacturing technique and that detects a strain generated in the semiconductor chip 1a as changes in resistance values of the resistors R1 and R2.

As in the semiconductor chip 1a, the semiconductor chip 1b is formed in a rectangle in plan view and includes a circuit board made of a semiconductor material, such as Si, and a strain gauge that has resistors R3 and R4 formed in the circuit board by a known semiconductor manufacturing technique and that detects a strain generated in the semiconductor chip 1b as changes in resistance values of the resistors R3 and R4.

In the semiconductor chip 1a, one surface on which the resistors R1 and R2 included in the strain gauge are formed may be referred to below as a "principal surface 1aA" and the surface opposite to the principal surface 1aA may be referred to below as a "back surface 1aB". In the semiconductor chip 1b, one surface on which the resistors R3 and R4 included in the strain gauge are formed may be referred to below as a "principal surface 1bA" and the surface opposite to the principal surface 1bA may be referred to below as a "back surface 1bB".

Figure 4:
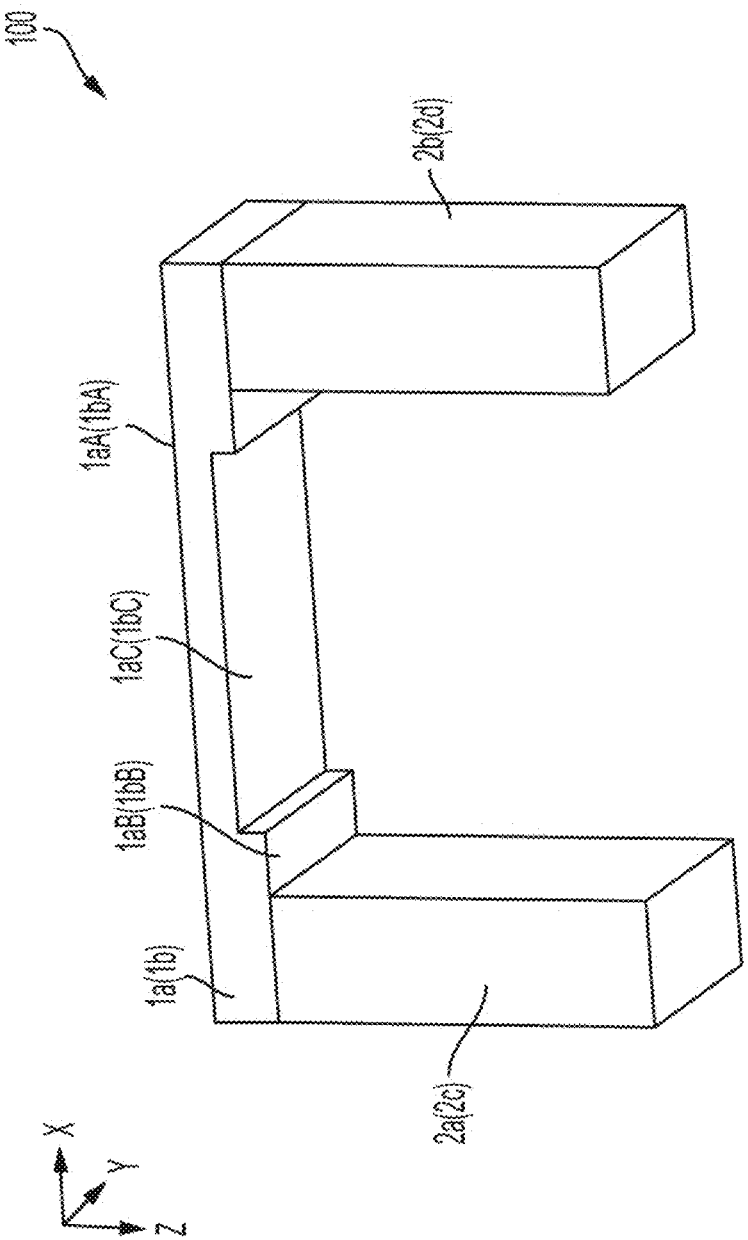
FIG. 4 is a perspective view illustrating a semiconductor chip 1a seen from a back surface.

FIG. 4 is a perspective view illustrating the semiconductor chip 1a seen from the back surface.

As illustrated in FIG. 4, a thin-walled portion (countersink) 1aC, which is thinner than the part to which the supporting members 2a and 2b are coupled, is formed in the surface of the semiconductor chip 1a facing the diaphragm 3 (that is, the back surface 1aB of the semiconductor chip 1a). Correspondingly, a thin-walled portion 1bC, which is thinner than the part to which the supporting members 2c and 2d are coupled, is formed in the back surface 1bB of the semiconductor chip 1b.

The thin-walled portion 1aC can be formed by selectively cutting down the semiconductor chip 1a from the back surface 1aB using, for example, a known etching technique. This is also true for the thin-walled portion 1bC.

The semiconductor chip 1a and the semiconductor chip 1b are formed in the same shape so that the same stress is generated when the same force is applied. In an embodiment, as an example, the semiconductor chip 1a and the semiconductor chip 1b are assumed to be formed in rectangles having the same thicknesses (lengths in the Z axis direction) and the same length and width (length in the X axis direction and length in the Y axis direction) in plan view.

The seat 5 is a member (base) for supporting the supporting members 2a and 2c on the supporting surface 3B of the diaphragm 3. In addition, the seat 6 is a member (base) for supporting the supporting members 2b and 2d on the supporting surface 3B of the diaphragm 3. The seats 5 and 6 are formed integrally with the diaphragm 3.

Although the seats 5 and 6 are made of the same material as in the diaphragm 3 and are integrally formed with the diaphragm 3 in an embodiment, as long as the seats 5 and 6 are fixed on the supporting surface 3B of the diaphragm 3, the material of the seats 5 and 6 may be different from that of the diaphragm 3 or the seats 5 and 6 may be formed separately from the diaphragm 3 and may be bonded to the supporting surface 3B using an adhesive.

As illustrated in FIG. 2, the seat 5 is disposed concentrically with the diaphragm 3 so as to make the amount of displacement of the supporting member 2a identical to the amount of displacement of the supporting member 2c supported by the seat 5 when the diaphragm 3 is bent and the seat 5 projects orthogonally from the supporting surface 3B. Similarly, the seat 6 is disposed concentrically with the diaphragm 3 so as to make the amount of displacement of the supporting member 2b identical to the amount of displacement of the supporting member 2d supported by the seat 6 when the diaphragm 3 is bent and the seat 6 projects orthogonally from the supporting surface 3B.

More specifically, the seat 5 is formed in a ring about a center 30 of the diaphragm 3. In addition, the seat 6 is formed in a ring having a diameter larger than in the seat 5 about the center 30 of the diaphragm 3. The seats 5 and 6 are fixed to the supporting surface 3B with the axes thereof orthogonal to the supporting surface 3B.

The supporting members 2a and 2b are structural bodies functioning as columns supporting the semiconductor chip 1a on the diaphragm 3. Similarly, the supporting members 2c and 2d are structural bodies functioning as columns supporting the semiconductor chip 1b on the diaphragm 3.

The supporting members 2a to 2d are formed in, for example, rectangular columns (or, for example, square columns). In addition, the supporting members 2a to 2d are made of an electrically insulated material. More preferably, the supporting members 2a to 2d are made of a material that is electrically insulated, has certain rigidity, and has smaller thermal conductivity. Glass (for example, borosilicate glass (Pyrex (registered trademark))) can be illustrated as a material of the supporting members 2a to 2d.

The supporting member 2a as a first structural body is provided orthogonally to the diaphragm 3 so that one end thereof is coupled onto the part of the seat 5 in one straight line 21 of two straight lines 21 and 22, orthogonal to each other, that pass through the center 30 of the supporting surface 3B of the diaphragm 3 in plan view and the other end thereof is coupled to the back surface 1aB of the semiconductor chip 1a. In addition, the supporting member 2b as a second structural body is provided orthogonally to the diaphragm 3 so that one end thereof is coupled to the part of the seat 6 in the straight line 21 in plan view and the other end is coupled to the back surface 1aB of the semiconductor chip 1a.

As illustrated in FIGS. 1 to 3, in the supporting members 2a and 2b, the one ends thereof are coupled onto the seats 5 and 6 and the other ends thereof are coupled onto the back surface of the semiconductor chip 1a. In the supporting members 2c and 2d, one ends thereof are coupled onto the seats 5 and 6 and the other ends thereof are coupled onto the back surface of the semiconductor chip 1b. The coupling between the supporting members 2a to 2d and the semiconductor chips 1a and 1b and the coupling between the supporting members 2a to 2d and the seats 5 and 6 are performed via, for example, an adhesive.

In the supporting member 2c as a third structural body, the one end thereof is coupled onto the seat 5 in the other straight line 22 of the above two straight lines 21 and 22 and the other end thereof is coupled to the back surface 1bB of the semiconductor chip 1b. In addition, in the supporting member 2d as a fourth structural body, the one end thereof is coupled onto the seat 6 in the straight line 22 and the other end thereof is coupled onto the back surface 1bB of the semiconductor chip 1b.

The heights (lengths in the Z axis direction) of the supporting members 2a to 2d provided orthogonally to the diaphragm 3 are identical to each other. The principal surfaces 1aA and 1bA of the semiconductor chips 1a and 1b supported by the supporting members 2a to 2d are parallel to the supporting surface 3B of the diaphragm 3.

Next, the principle of how a stress is generated in the semiconductor chips 1a and 1b in the pressure sensor 100 according to embodiment 1 will be described. Since there is no difference in the principle of generation of a stress between the semiconductor chip 1a and the semiconductor chip 1b, the principle of generation of a stress is described only for the semiconductor chip 1a as an example.

Figure 5:
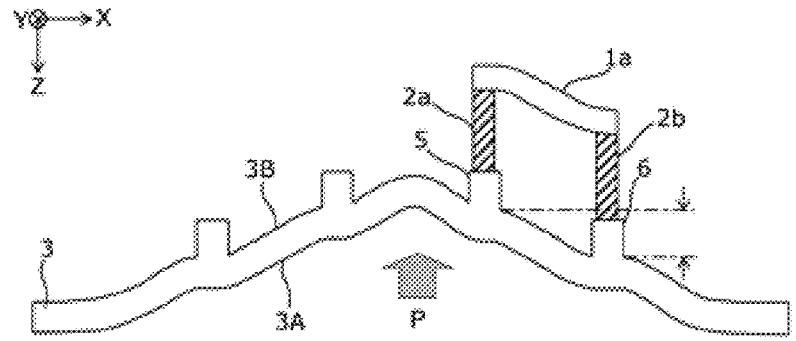
FIG. 5 schematically illustrates the displacement of supporting members 2a and 2b and the semiconductor chip 1a when a diaphragm 3 is deformed in the pressure sensor according to an embodiment of the invention.
Figure 6:
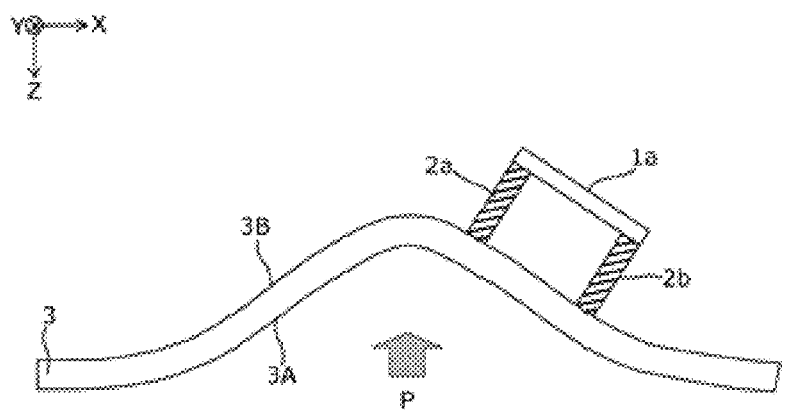
FIG. 6 schematically illustrates the displacement of the semiconductor chip 1a when the supporting members 2a and 2b are directly coupled to the diaphragm 3 without providing annular seats 5 and 6 as a comparative example of the pressure sensor according to an embodiment of the invention.

FIG. 5 schematically illustrates the displacement of the supporting members 2a and 2b and the displacement of the semiconductor chip 1a when the diaphragm 3 is deformed in the pressure sensor 100, and FIG. 6 schematically illustrates, as a comparative example for the pressure sensor 100 according to embodiment 1, the displacement of the semiconductor chip 1a when the supporting members 2a and 2b are directly coupled to the diaphragm 3 without providing the annular seats 5 and 6.

First, as illustrated in FIG. 6, when the supporting members 2a and 2b are directly coupled to the supporting surface 3B of the diaphragm 3 without providing the annular seats 5 and 6, if the diaphragm 3 is deformed by pressure P from the fluid, the supporting members 2a and 2b are inclined while keeping the state in which the supporting members 2a and 2b are orthogonal to the diaphragm 3. That is, the supporting member 2a and the supporting member 2b are displaced in the X axis direction in addition to the Z axis direction according to the deformation of the diaphragm 3. Accordingly, the displacement of the diaphragm 3 is not appropriately transmitted to the semiconductor chip 1a and a strain is hardly generated in the semiconductor chip 1a. Therefore, it is difficult to detect the pressure of the fluid using the semiconductor chip 1a.

In contrast, in the pressure sensor 100 according to embodiment 1, as illustrated in FIG. 5, when the diaphragm 3 is deformed by pressure P from the fluid, the seats 5 and 6 are displaced only in the Z axis direction without being inclined with respect to the Z axis due to the rigidity of the coupling part between the seats 5 and 6 and the diaphragm 3. As a result, the displacement in the Z axis direction of the diaphragm 3 that depends on the distance from the center of the diaphragm 3 is mainly transmitted to the supporting members 2a and 2b.

This causes a tensile stress that depends on the displacement difference in the Z axis direction between the supporting member 2a and the supporting member 2b in the region in the semiconductor chip 1a close to the principal surface 1aA. Accordingly, if the resistors R1 and R2 included in the above strain gauge (bridge circuit) are formed appropriately in the region in the semiconductor chip 1a in which the above tensile stress is generated, it is possible to detect the pressure of the measurement target fluid more accurately.

Since the semiconductor chip 1b is supported by two columns (supporting members 2c and 2d) on the seats 5 and 6 concentric with the diaphragm 3 as in the semiconductor chip 1a, a stress is generated by the same principles as in the semiconductor chip 1a.

As the widths (distances in the radial directions (X axis direction and Y axis direction) of the rings) of the coupling surfaces between the seats 5 and 6 and the diaphragm 3 are increased, the deformation of the diaphragm 3 is suppressed and the sensor sensitivity is reduced. In contrast, as the above widths are reduced, the rigidity of the coupling parts between the seats 5 and 6 and the diaphragm 3 is reduced, the seats 5 and 6 are easily inclined in the X axis direction when the diaphragm 3 is deformed, and the adhesion strength with the supporting members 2a and 2b is reduced. Accordingly, the above widths need to be changed as appropriate in consideration of the requested sensor sensitivity or adhesive strength.

Next, the strain gauge of the pressure sensor 100 will be specifically described.

Figure 7:
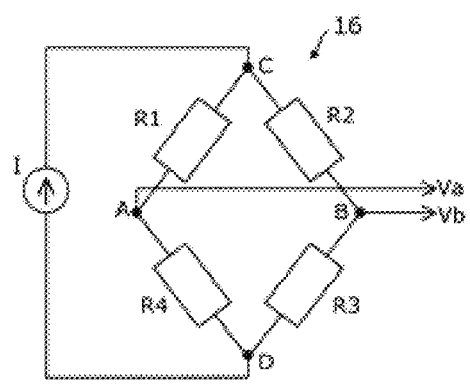
FIG. 7 illustrates the structure of a bridge circuit as a strain gauge.

As illustrated in FIG. 7, the strain gauge of the pressure sensor 100 includes, for example, a bridge circuit 16 in which the two resistors (for example diffusion resistors) R1 and R2 formed on the semiconductor chip 1a are electrically connected to the resistors R3 and R4 formed on the semiconductor chip 1b. It should be noted that signal lines for connecting the resistors R1 to R4 are not illustrated in FIGS. 1 to 4.

Preferably, the semiconductor chip 1a and the semiconductor chip 1b are cut out from the semiconductor substrate of the same lot to reduce relative variations in the resistors R1 to R4.

The pressure sensor 100 can measure the pressure of the measurement target fluid by detecting changes in the resistance values of the resistors R1 to R4 as changes in voltages caused by the stresses generated in the semiconductor chips 1a and 1b in the state in which a constant current flows through the bridge circuit 16.

Figure 8:
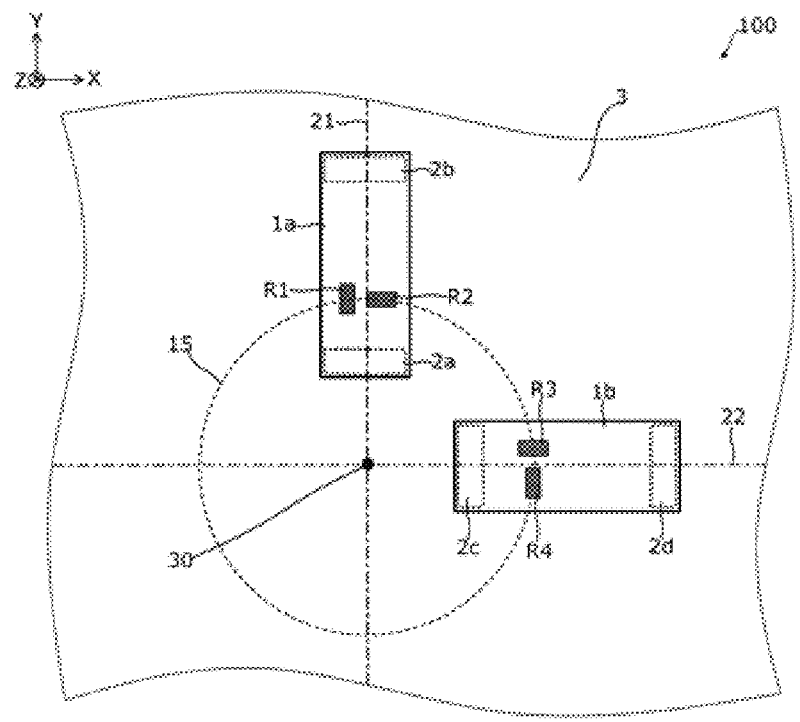
FIG. 8 illustrates an example of disposing resistors constituting the strain gauge on the semiconductor chips.

FIG. 8 illustrates an example of disposing the resistors R1 to R4 on the semiconductor chips 1a and 1b in the pressure sensor according to embodiment 1. It should be noted that the seats 5 and 6 are not illustrated in FIG. 8.

The resistors R1 and R2 are formed in the region (that is, the region on the principal surface 1aA of the semiconductor chip 1a in which a tensile stress is generated) in which a stress generated in the semiconductor chip 1a is positive (+) when the diaphragm 3 is bent by the pressure of the fluid. Specifically, as illustrated in FIG. 8, the resistors R1 and R2 are formed in the region on the principal surface 1aA corresponding to the thin-walled portion 1aC between the coupling surface of the supporting member 2a and the coupling surface of the supporting member 2b disposed in the straight line 21 in plan view in the semiconductor chip 1a.

The resistors R3 and R4 are formed in the region (that is, the region on the principal surface 1bA of the semiconductor chip 1b in which a tensile stress is generated) in which a stress generated in the semiconductor chip 1b is positive (+) when the diaphragm 3 is bent by the pressure of the fluid. Specifically, as illustrated in FIG. 8, the resistors R3 and R4 are formed in the region on the principal surface 1bA corresponding to the thin-walled portion 1bC between the coupling surface of the supporting member 2c and the coupling surface of the supporting member 2d disposed in the straight line 22 in plan view in the semiconductor chip 1.

The resistors R1 to R4 are formed in, for example, rectangles in plan view. Although the resistors R1 to R4 are formed in the same rectangles (strips) in plan view and have the same resistance value in the embodiment, the invention is not limited to this embodiment.

The resistor R1 and the resistor R2 may extend in directions different from each other in plan view and the resistor R3 and the resistor R4 may extend in directions different from each other in plan view. The direction in which the resistors R1 to R4 extend refers to the direction in which a current flows when a voltage is applied to the resistors R1 to R4.

As illustrated in FIG. 8, the resistor R1 and the resistor R4 may extend in the same direction in plan view and the resistor R2 and the resistor R3 may extend in the same direction in plan view. Alternatively, the direction in which the resistor R1 and the resistor R4 extend may be orthogonal to the direction in which the resistor R2 and the resistor R3 extend. For example, as illustrated in FIG. 8, the resistor R1 and the resistor R4 may extend in a direction parallel to the straight line 21 and the resistor R2 and the resistor R3 may extend in a direction parallel to the straight line 22.

In addition, the resistors R1 to R4 may be disposed equidistantly (with a deviation ranging within, for example, plus or minus 10 percent) from the center 30 of the diaphragm 3. Specifically, the distances from the center 30 of the diaphragm 3 to the centers of the rectangular resistors R1, R2, R3, and R4 may be the same. For example, as illustrated in FIG. 8, the resistor R1, R2, R3, and R4 may be disposed in the circumference of a circle 15 having the same center 30 as the diaphragm 3 in plan view.

The diameter of the circle 15 is not particularly limited as long as the circle 15 fits within the thin-walled portions 1aC and 1bC of the semiconductor chips 1a and 1b.

The pressure sensor 100 configured as described above has the following effects. The effects of the pressure sensor 100 will be described below by comparing the pressure sensor 100 according to embodiment 1 with a different pressure sensor 901.

First, the pressure sensor 901, which is a comparative example for the pressure sensor 100 according to embodiment 1, will be described.

Figure 9:
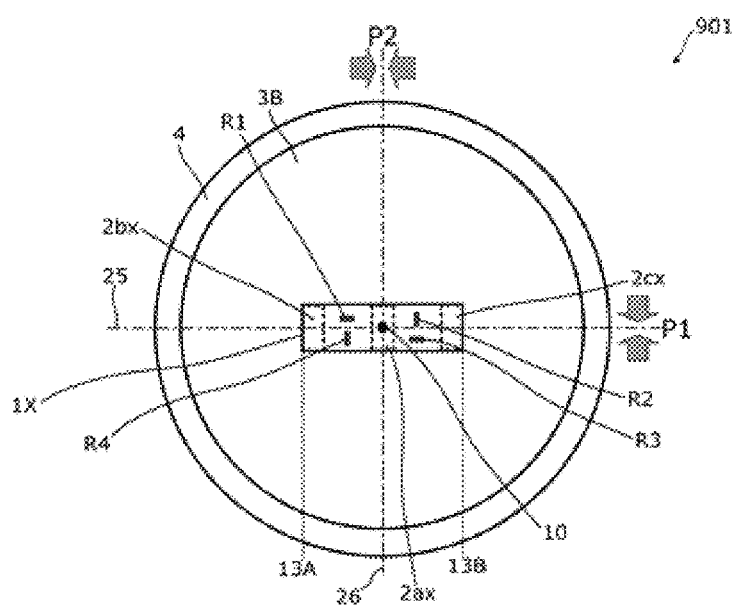
FIG. 9 illustrates a pressure sensor 901 in which a semiconductor chip 1X that is rectangular in plan view is supported by supporting members 2ax, 2bx, and 2cx at a position close to a center 30 of a supporting surface 3B of the diaphragm 3 as a comparative example of the pressure sensor according to an embodiment of the invention.

FIG. 9 illustrates the pressure sensor 901 as a comparative example.

The pressure sensor 901 has a semiconductor chip 1X that is rectangular in plan view and three supporting members 2ax, 2bx, and 2cx for supporting the semiconductor chip 1X provided side by side orthogonally in a straight line 25 passing through the center 30 of the supporting surface 3B of the diaphragm 3. As shown in FIG. 9, the center 10 of semiconductor chip 1X is aligned with the center 30 of the supporting surface 3B of the diaphragm 3.

Figure 10:
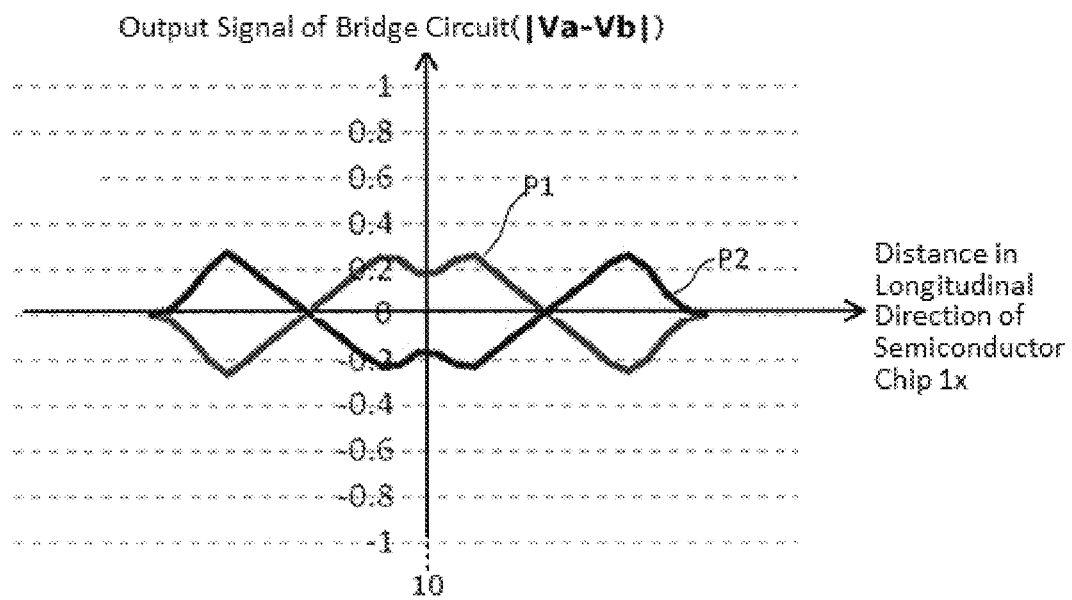
FIG. 10 illustrates the result of simulation of a sensor output from the pressure sensor 901 in FIG. 9 using the finite element method.

FIG. 10 illustrates the result of simulation of a sensor output (an output signal of the bridge circuit) of the above pressure sensor 901 using the finite element (FEM) method. In FIG. 10, the horizontal axis represents the distance in the longitudinal direction of the semiconductor chip 1X from the center in the longitudinal direction of the semiconductor chip 1X when the center is assumed to be 0 and the vertical axis represents the magnitude of the output signal (|Va−Vb|) of the bridge circuit 16 obtained by conversion based on the stress distribution of the four resistors R1 to R4 of the semiconductor chip 1X.

In FIG. 10, reference numeral P1 represents the magnitude of the output signal of the bridge circuit 16 obtained by conversion based on the stress distribution of the resistors R1 to R4 when changing the positions in which the resistors R1 to R4 are formed with respect to the center of the semiconductor chip 1X when a nut 52 of a clamp 50 is fixed at position P1 in the straight line 25 illustrated in FIG. 9 and reference numeral P2 represents the magnitude of the output signal of the bridge circuit 16 obtained by conversion based on the stress distribution of the resistors R1 to R4 when changing the positions in which the resistors R1 to R4 are formed with respect to the center of the semiconductor chip 1X when the nut 52 of the clamp 50 is fixed at position P2 in the straight line 26 illustrated in FIG. 9.

In the pressure sensor 901 having the rectangular semiconductor chip 1X, since the stress distribution on the semiconductor chip 1X greatly changes depending on the tightening position of the nut 52, the deviation of the resistance ratio of the four resistors disposed in line symmetry with respect to a straight line 26 also changes depending on the tightening position of the nut 52. As a result, the shift amount of the zero point of a sensor output (an output signal of the bridge circuit 16 included in the strain gauge) greatly varies depending on the tightening position of the nut 52 as illustrated in FIGS. 9 and 10 in the pressure sensor 901.

In contrast, in the pressure sensor 100 according to embodiment 1, the shift amount of the zero point of a sensor output (an output signal of the bridge circuit 16 included in the strain gauge) becomes smaller than in the pressure sensor 901 as described later. The pressure sensor 100 according to embodiment 1 will be described in detail below.

Figure 11:
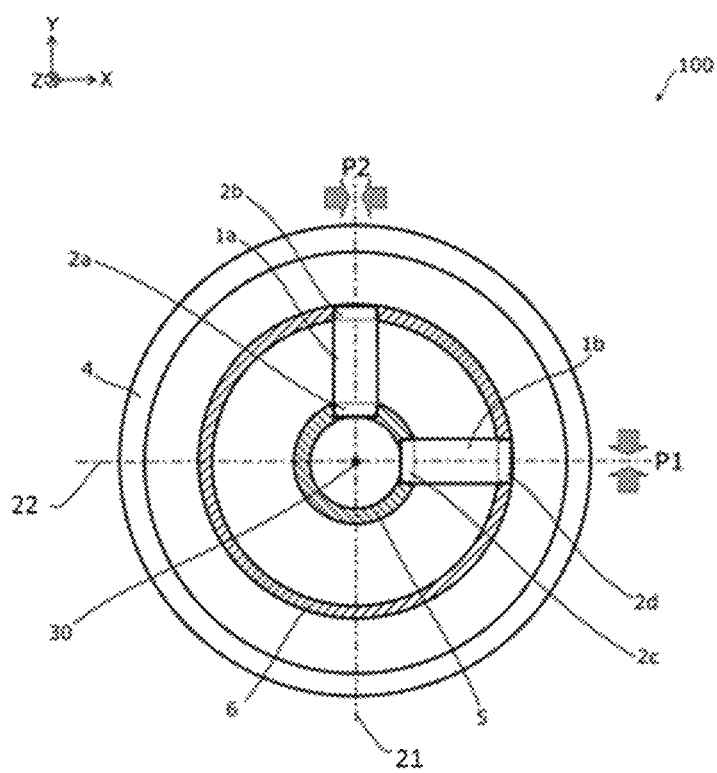
FIG. 11 illustrates fixation positions of a nut of a clamp for connecting a pipe to the pressure sensor according to an embodiment of the invention.

FIG. 11 illustrates fixation positions of the nut of the clamp for connecting a pipe to the pressure sensor 100 according to embodiment 1.

Figure 12A:
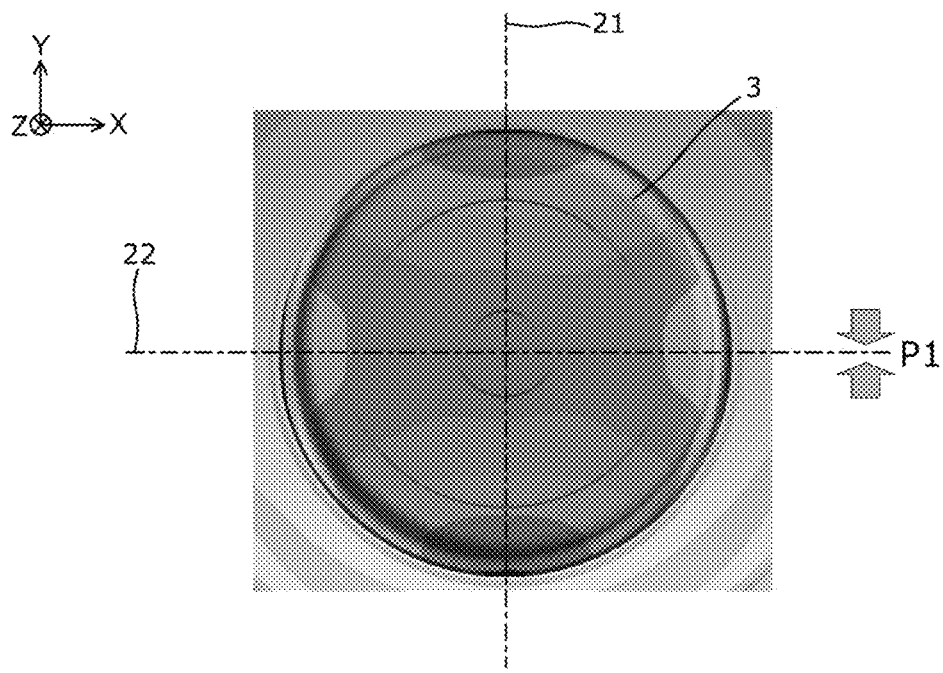
FIG. 12A is a contour diagram illustrating the displacement in the Z axis direction of the diaphragm 3 when a nut 52 of a clamp 50 is fixed at position P1 illustrated in FIG. 11.
Figure 12B:
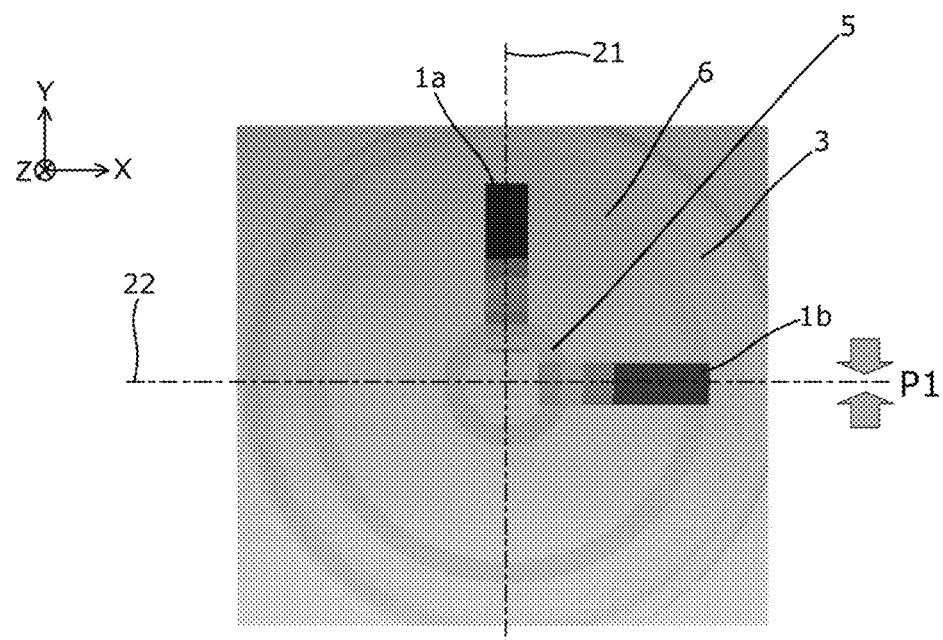
FIG. 12B is a contour diagram illustrating the displacement in the Z axis direction of the semiconductor chips 1a and 1b when the nut 52 of the clamp 50 is fixed at position P1 illustrated in FIG. 11.

FIG. 12A is a contour diagram (isoline diagram) illustrating the displacement in the Z axis direction of the diaphragm 3 when the nut 52 of the clamp 50 is fixed at position P1 in the straight line 22 illustrated in FIG. 11 and FIG. 12B is a contour diagram illustrating the displacement in the Z axis direction of the semiconductor chips 1a and 1b when the nut 52 of the clamp 50 is fixed at position P1 in the straight line 22 illustrated in FIG. 11.

Figure 13A:
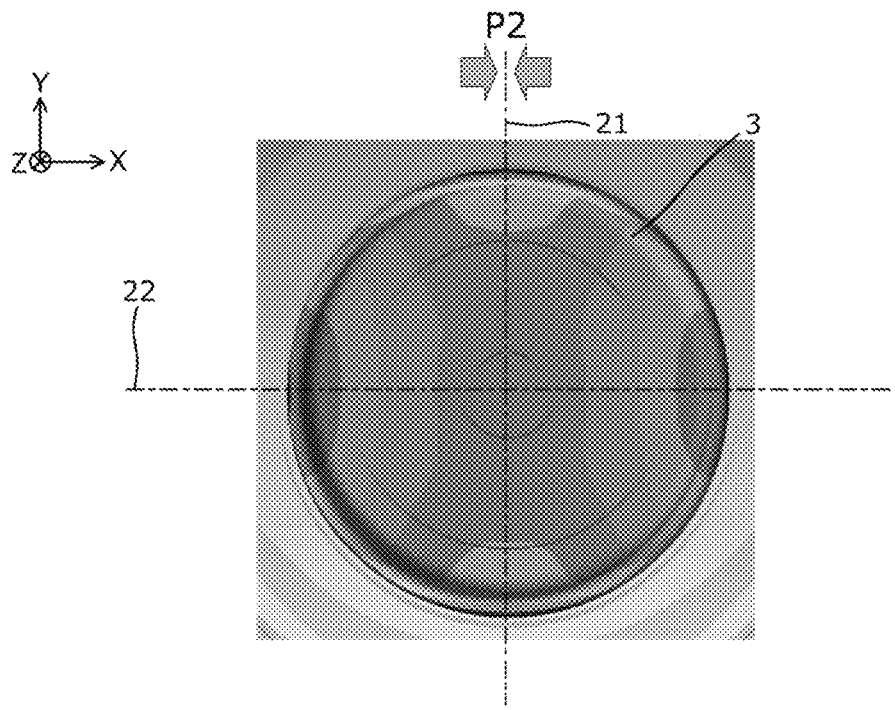
FIG. 13A is a contour diagram illustrating the displacement in the Z axis direction of the diaphragm 3 when the nut 52 of the clamp 50 is fixed at position P2 illustrated in FIG. 11.
Figure 13B:
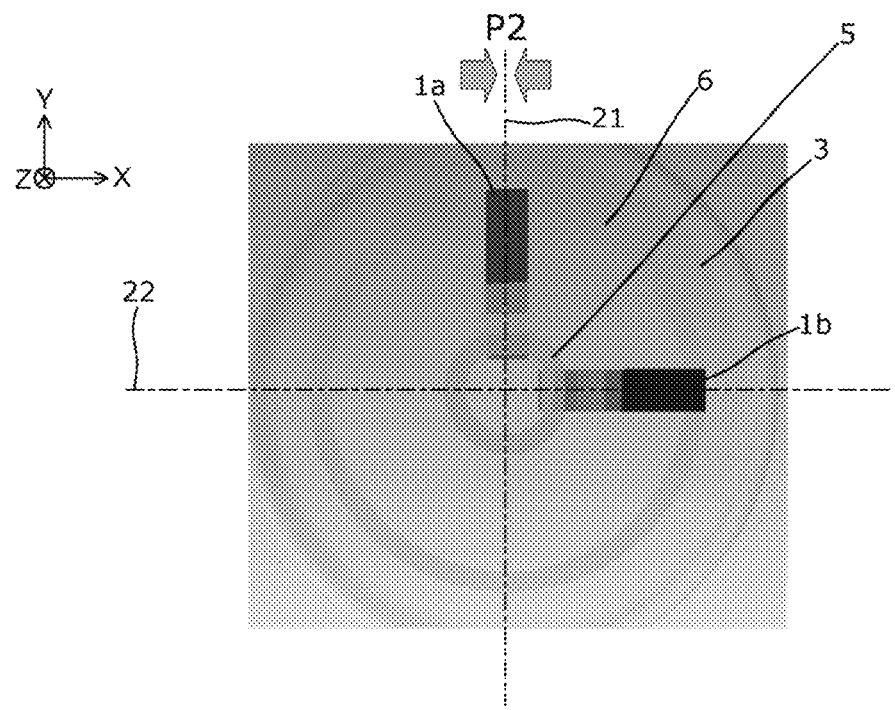
FIG. 13B is a contour diagram illustrating the displacement in the Z axis direction of the semiconductor chips 1a and 1b when the nut 52 of the clamp 50 is fixed at position P2 illustrated in FIG. 11.

FIG. 13A is a contour diagram (isoline diagram) illustrating the displacement in the Z axis direction of the diaphragm 3 when the nut 52 of the clamp 50 is fixed at position P2 in the straight line 21 illustrated in FIG. 11 and FIG. 13B is a contour diagram illustrating the displacement in the Z axis direction of the semiconductor chips 1a and 1b when the nut 52 of the clamp 50 is fixed at position P2 in the straight line 21 illustrated in FIG. 11.

In the contour diagrams in FIGS. 12A, 12B, 13A, and 13B, regions having the same displacement in the Z axis direction are given the same color.

As is clear from FIGS. 12A and 13A, when the position at which the nut 52 is tightened differs by 90 degrees in plan view in the pressure sensor 100 according to embodiment 1, the displacement in the Z axis direction of the diaphragm 3 is reversed.

At this time, since the four supporting members 2a to 2d are fixed in the two straight lines 21 and 22, orthogonal to each other, that pass through the center 30 of the diaphragm 3 in plan view and the supporting members 2a to 2d support the semiconductor chips 1a and 1b that are rectangular in plan view using the supporting surface 3B of the diaphragm 3 in the pressure sensor 100 according to the embodiment, the displacements in the Z axis direction of the semiconductor chips 1a and 1b are also reversed as illustrated in FIGS. 12B and 13B.

In the pressure sensor 100 according to the embodiment, the resistors R1 to R4 included in the strain gauge are disposed in the regions of the semiconductor chips 1a and 1b in which stress distributions in directions opposite to each other are generated when the clamp 50 is tightened by the nut 52. Specifically, as illustrated in FIG. 8, a pair of resistors (resistors R1 and R2) is formed in the region between the supporting member 2a and the supporting member 2b in the semiconductor chip 1a and another pair of resistors (resistors R3 and R4) is formed in the region between the supporting member 2c and the supporting member 2d in the semiconductor chip 1b.

Accordingly, when the nut 52 of the clamp 50 is tightened, stresses in directions opposite to each other are generated in the region between the supporting member 2a and the supporting member 2b in which the resistors R1 and R2 are formed in the semiconductor chip 1a and the region between the supporting member 2c and the supporting member 2d in which the resistors R3 and R4 are formed in the semiconductor chip 1b, so it is possible to align the directions in which the resistance values of the resistors R1 to R4 are changed by the stresses by appropriately setting the directions in which the resistors R1 to R4 extend.

Specifically, the directions in which the resistors R1 to R4 extend only need to be determined so that the resistance value of the resistor R1 and the resistance value of the resistor R4 change in the same direction and the resistance value of the resistor R2 and the resistance value of the resistor R3 change in the same direction when the nut 52 of the clamp 50 is tightened. For example, as illustrated in FIG. 8, the resistor R1 and the resistor R4 extend in the same direction and the resistor R2 and the resistor R3 extend in the same direction. This changes the resistance values of the resistor R1 and the resistor R4 by substantially the same amount in the same direction and changes the resistance values of the resistor R2 and the resistor R3 by substantially the same amount in the same direction when the nut 52 of the clamp 50 is tightened.

As described above, by selecting the directions in which the resistor R1 and the resistor R4 extend so that the resistance values of the resistor R1 and the resistor R4 are changed in the same direction when the nut 52 of the clamp 50 is tightened, the deviation of the resistance ratio between the resistor R1 and the resistor R4 close to an output signal Va of the bridge circuit 16 included in the strain gauge can be suppressed. Similarly, by selecting the directions in which the resistor R2 and the resistor R3 extend so that the resistance values of the resistor R2 and the resistor R3 are changed in the same direction when the nut 52 of the clamp 50 is tightened, the deviation of the resistance ratio between the resistor R2 and the resistor R3 close to an output signal Vb of the bridge circuit 16 included in the strain gauge can be suppressed.

Figure 14:
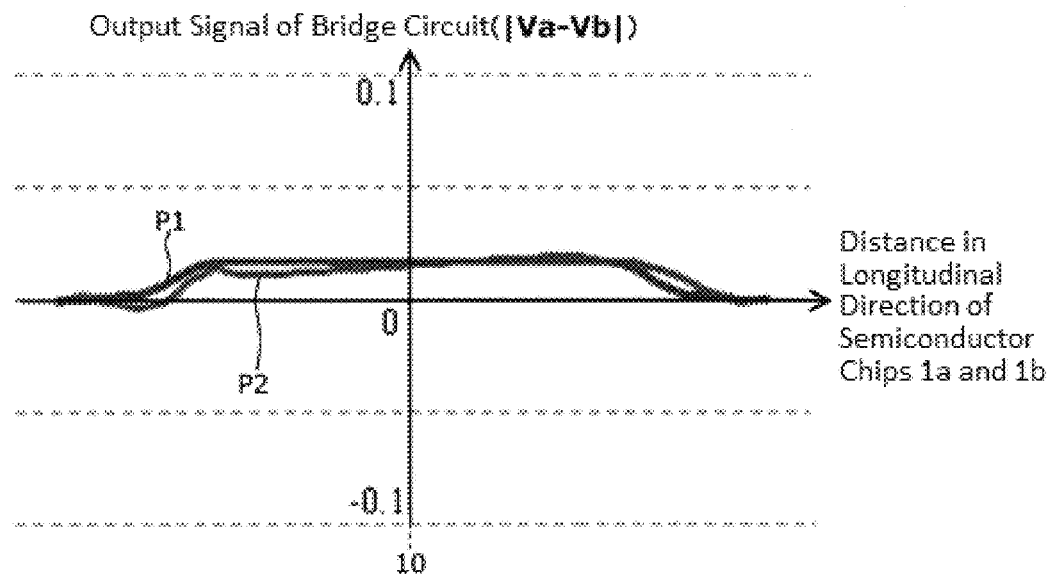
FIG. 14 illustrates the result of simulation of a sensor output from the pressure sensor according to an embodiment of the invention.

FIG. 14 illustrates the result of simulation of an output signal of the bridge circuit 16 of the pressure sensor 100 using the FEM when the position of the nut 52 for fixing the clamp 50 is changed as illustrated in FIG. 11. FIG. 14 illustrates the result of simulation when the resistors R1 to R4 of the bridge circuit 16 of the pressure sensor 100 are disposed as illustrated in FIG. 8.

In FIG. 14, the horizontal axis represents the distance in the longitudinal direction of the semiconductor chips 1a and 1b from the centers in the longitudinal direction of the semiconductor chips 1a and 1b when the centers are assumed to be 0 and the vertical axis represents the magnitude of the output signal (|Va−Vb|) of the bridge circuit 16 obtained by conversion based on the stress distribution of the four resistors R1 to R4 of the semiconductor chips 1a and 1b. This simulation assumes that the semiconductor chip 1a and the semiconductor chip 1b have the same shape and the positions of the resistor R1 and the resistor R2 on the semiconductor chip 1a are the same (disposed in the circumference of the circle 15 in FIG. 8) as the positions of the resistor R3 and the resistor R4 on the semiconductor chip 1b.

In FIG. 14, reference numeral P1 represents the magnitude of the output signal of the bridge circuit 16 obtained by conversion based on the stress distribution of the resistors R1 to R4 when changing the positions in which the resistors R1 to R4 are formed with respect to the centers of the semiconductor chips 1a and 1b when the nut 52 of the clamp 50 is fixed at position P1 in the straight line 22 illustrated in FIG. 11 and reference numeral P2 represents the magnitude of the output signal of the bridge circuit 16 obtained by conversion based on the stress distribution of the resistors R1 to R4 when changing the positions in which the resistors R1 to R4 are formed with respect to the centers of the semiconductor chips 1a and 1b when the nut 52 of the clamp 50 is fixed at position P2 in the straight line 21 illustrated in FIG. 11.

As described above, since the deviation of the resistance ratio between the resistor R1 and the resistor R4 close to the output signal Va in the bridge circuit 16 and the deviation of the resistance ratio between the resistor R2 and the resistor R3 close to the output signal Vb can be suppressed by disposing the resistors R1 to R4 as illustrated in FIG. 8, fluctuations in the output signals Va and Vb of the bridge circuit 16 before and after the nut 52 of the clamp 50 is tightened can be suppressed and variations in the fluctuation amount of the output signals Va and Vb when the position at which the nut 52 of the clamp 50 is tightened is changed can be also suppressed. As a result, as illustrated in FIG. 14, the shift amount of the zero point of a sensor output (an output signal |Va−Vb| of the bridge circuit 16) of the pressure sensor 100 when the nut 52 of the clamp 50 is tightened is suppressed and variations in the above shift amount caused by the differences in the tightening position of the nut 52 of the clamp 50 can be also suppressed.

As described above, in the pressure sensor 100 according to the embodiment, unlike the above pressure sensor 901 in which the four resistors included in the bridge circuit are disposed in line symmetry with respect to the straight line 26 passing through the center of the diaphragm 3 in plan view, since the resistors R1 and R2 are disposed in the region between the two supporting members 2a and 2b for supporting the semiconductor chip 1a and the resistors R3 and R4 are disposed in the region between the two supporting members 2c and 2d for supporting the semiconductor chip 1b in the semiconductor chips 1a and 1b disposed in the two straight lines 21 and 22, orthogonal to each other, that pass through the center 30 of the diaphragm 3, fluctuations in the resistance ratio between the resistor R1 and the resistor R4 and fluctuations in the resistance ratio between the resistor R2 and the resistor R3 when the nut 52 of the clamp 50 is tightened can be suppressed. This can suppress the shift amount of the zero point of a sensor output (output signal |Va−Vb| of the bridge circuit 16) of the pressure sensor 100 when the nut 52 of the clamp 50 is tightened and also suppress variations in the above shift amount caused by the differences in the tightening position of the nut 52 of the clamp 50.

In particular, when the resistor R1 and the resistor R4 extend in the same direction and the resistor R2 and the resistor R3 extend in the same direction, the resistance values of the resistor R1 and the resistor R4 can be changed by substantially the same amount in the same direction and the resistance values of the resistor R2 and the resistor R3 can be changed by substantially the same amount in the same direction when the nut 52 of the clamp 50 is tightened. Accordingly, the shift amount of the zero point of a sensor output (output signal |Va−Vb| of the bridge circuit 16) of the pressure sensor 100 when the nut 52 of the clamp 50 is tightened can be further suppressed and variations in the above shift amount caused by the differences in the tightening position of the nut 52 of the clamp 50 can be further suppressed.

In addition, if the resistors R1 to R4 are formed in positions (for example, in the circumference of the circle 15) equidistant from the center 30 of the diaphragm 3 in plan view, it is possible to equalize the change amounts of the resistance values of the resistors R1 to R4 caused by stresses in the semiconductor chips 1a and 1b generated when the nut 52 is tightened, enabling further reduction in the shift amount of the zero point of a sensor output and variations in the shift amount.

In addition, since the deviation amount of the resistance ratio between the resistor R1 and the resistor R4 close to the output signal Va of the bridge circuit 16 and the deviation amount of the resistance ratio between the resistor R2 and the resistor R3 close to the output signal Vb of the bridge circuit 16 can be further increased when a pressure is applied to the pressure receiving surface 3A of the diaphragm 3 by the pressure from the measurement target fluid by making the direction in which the resistor R1 and the resistor R4 extend subststantially orthogonal to the direction in which the resistor R2 and the resistor R3 extend, the sensor sensitivity of the pressure sensor 100 with respect to the pressure applied to the pressure receiving surface 3A of the diaphragm 3 can be further improved.

In addition, since stresses easily concentrate on the resistors R1 to R4 by forming the resistors R1 to R4 in the regions corresponding to the thin-walled portions 1aC and 1bC of the semiconductor chips 1a and 1b in plan view, the sensor sensitivity of the pressure sensor 100 with respect to the pressure applied to the pressure receiving surface 3A of the diaphragm 3 can be further improved.

Although the resistor R1 and the resistor R2 are disposed side by side in a direction (direction parallel to the straight line 22) parallel to a shorter side of the semiconductor chip 1a and the resistor R3 and the resistor R4 are disposed side by side in a direction (direction parallel to the straight line 21) parallel to a shorter side of the semiconductor chip 1b in the embodiment described above (see FIG. 8), the resistors R1 to R4 only need to be disposed so that the resistance value of the resistor R1 and the resistance value of the resistor R4 are changed in the same direction and the resistance value of the resistor R2 and the resistance value of the resistor R3 are changed in the same direction when the nut 52 of the clamp 50 is tightened. For example, the resistors R1 to R4 may be disposed as illustrated in FIG. 15.

Figure 15:
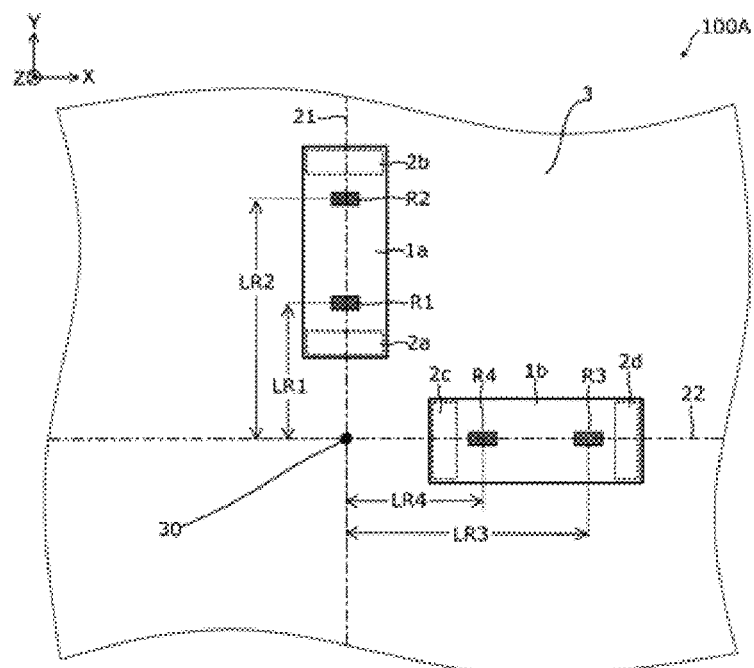
FIG. 15 illustrates another example of the disposition of resistors in the pressure sensor according to an embodiment of the invention.

FIG. 15 illustrates another example of disposing the resistors of the pressure sensor according to an embodiment of the invention.

It should be noted that the seats 5 and 6 are not illustrated in FIG. 15.

In a pressure sensor 100A illustrated in FIG. 15, the resistor R1 and the resistor R2 are disposed side by side in a direction (direction parallel to the straight line 21) parallel to a longer side of the semiconductor chip 1a and the resistor R3 and resistor R4 are disposed side by side in a direction (direction parallel to the straight line 22) parallel to a longer side of the semiconductor chip 1b. Here, the resistors R1 to R4 are formed in, for example, rectangles in plan view and extend in the same direction. For example, as illustrated in FIG. 15, the resistors R1 to R4 extend in a direction parallel to the straight line 22.

Since this changes the resistance value of the resistor R1 and the resistance value of the resistor R4 in the same direction and changes the resistance value of the resistor R2 and the resistance value of the resistor R3 in the same direction when the nut 52 of the clamp 50 is tightened as in the example of disposing the resistors R1 to R4 illustrated in FIG. 8, the shift amount of the zero point of a sensor output and variations in the shift amount can be reduced.

In addition, in FIG. 15, a distance (for example, the distance to the center of the resistor R1) LR1 from the center 30 of the diaphragm 3 to the resistor R1 may be equal to (with an error of, for example, plus or minus 10 percent) a distance (for example, the distance to the center of the resistor R4) LR4 from the center 30 of the diaphragm 3 to the resistor R4, and a distance (for example, the distance to the center of the resistor R2) LR2 from the center 30 of the diaphragm 3 to the resistor R2 may be equal to (with a error of, for example, plus or minus 10 percent) a distance (for example, the distance to the center of the resistor R3) LR3 from the center 30 of the diaphragm 3 to the resistor R3.

Since this makes the fluctuation amount of the resistance value of the resistor R1 identical to the change amount of the resistance value of the resistor R4 and makes the fluctuation amount of the resistance value of the resistor R2 identical to the change amount of the resistance value of the resistor R3, based on a stress caused by tightening the nut 52, the shift amount of the zero point of a sensor output and variations in the shift amount can be further reduced and the deviation of the resistance ratio between the resistor R1 and the resistor R4 and the deviation of the resistance ratio between the resistor R2 and the resistor R3 when a pressure is applied to the pressure receiving surface 3A of the diaphragm 3 can be further increased. Accordingly, the sensor sensitivity of the pressure sensor 100 can be further improved.

Although the invention implemented by the inventors has been described above specifically based on the exemplary embodiments, the invention is not limited to these embodiments and it will be appreciated that various modifications can be made without departing from the scope of the invention.

Figure 16:
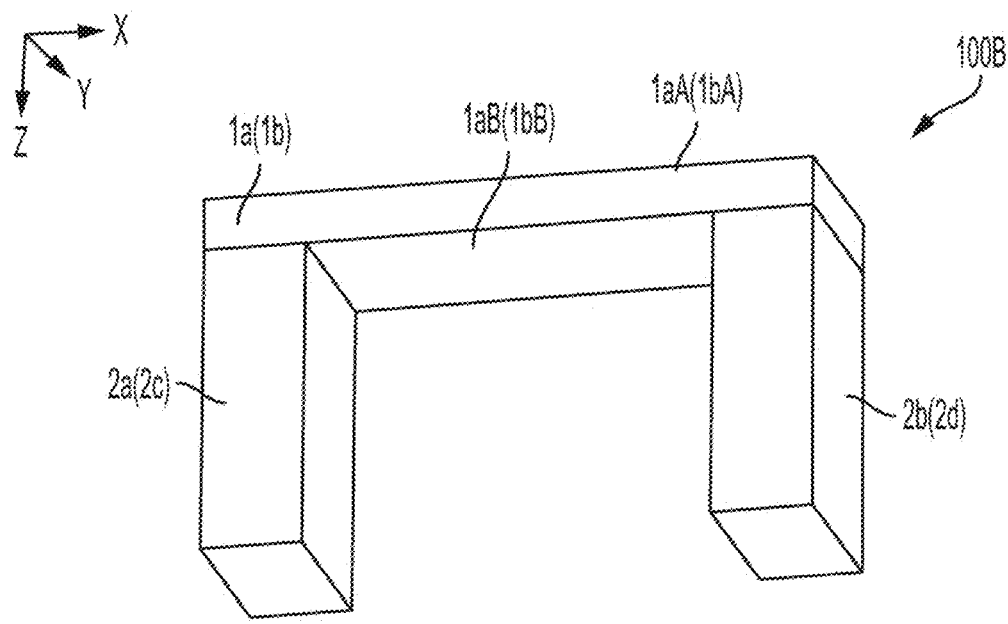
FIG. 16 is a perspective view illustrating a semiconductor chip of a pressure sensor according to another embodiment of the invention seen from a back surface.

For example, although the thin-walled portion 1aC is formed on the back surface 1aB of the semiconductor chip 1a in the above embodiment, as long as sufficient sensor sensitivity can be obtained as the pressure sensor, the thickness between the principal surface 1aA and the back surface 1aB may be uniform without forming the thin-walled portion 1aC on the semiconductor chip 1a as in a pressure sensor 100B illustrated in FIG. 16. This is also true for the semiconductor chip 1b.

Figure 17:
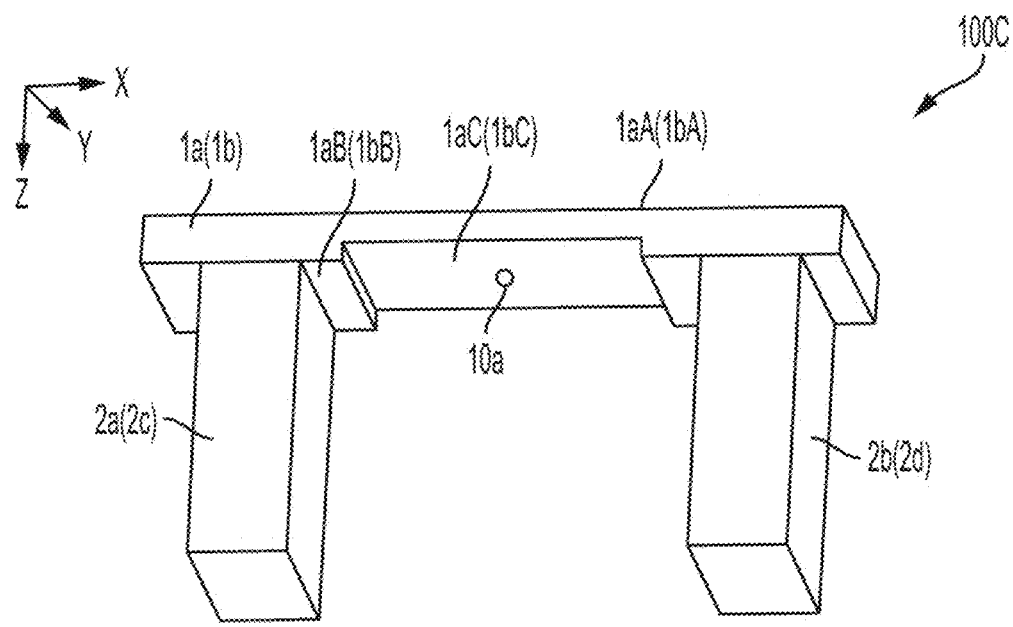
FIG. 17 is a perspective view illustrating a semiconductor chip of a pressure sensor according to another embodiment seen from a back surface.

In addition, although the supporting members 2a and 2b are coupled to the back surface 1aB of the semiconductor chip 1a so that the side surfaces of the supporting members 2a and 2b are flush with the side surfaces of the semiconductor chip 1a in the above embodiment, the supporting members 2a, 2b, 2c, and 2d may be coupled to positions inward of the side surfaces of the semiconductor chips 1a and 1b. For example, as in a pressure sensor 100C illustrated in FIG. 17, the supporting members 2a and 2b may be coupled to positions closer to a center 10a of the semiconductor chip 1a than in the pressure sensor 100 in FIG. 4.

Figure 18:
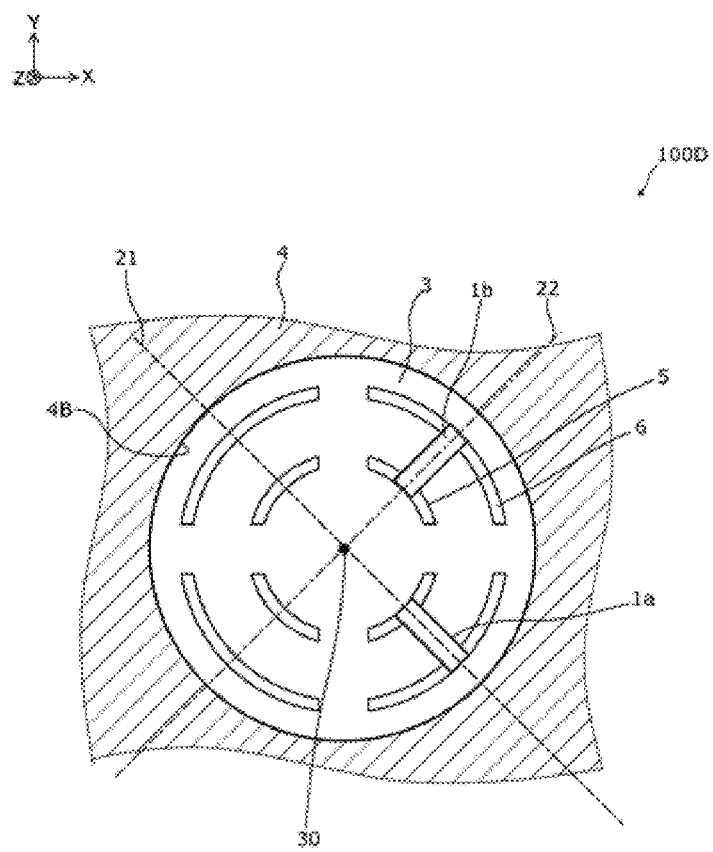
FIG. 18 illustrates an example of a seat having slits in a circumferential direction.
Figure 19:
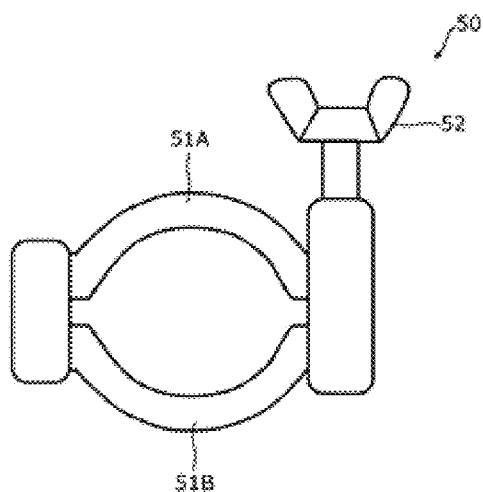
FIG. 19 illustrates a planar structure of a clamp for connecting a pressure sensor to a pipe.
Figure 20:
FIG. 20 illustrates a connection structure for a pressure sensor and a pipe via a clamp.
Figure 20:
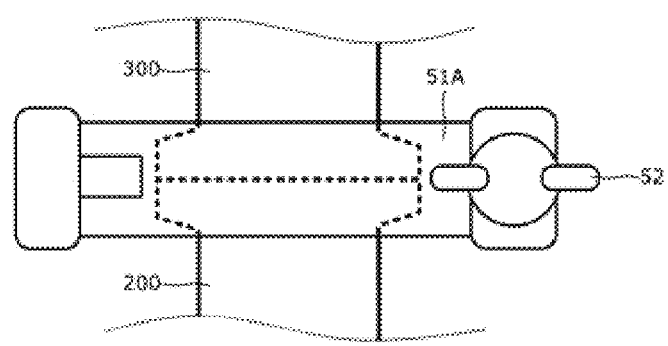

In addition, although the seats 5 and 6 are formed continuously along the circumferential direction thereof in the above embodiment, the invention is not limited to the embodiment and the seats 5 and 6 may be formed intermittently along the circumferences thereof. For example, as in a pressure sensor 100D illustrated in FIG. 18, the seats 5 and 6 may be quartered so that the seats 5 and 6 have four intermittent parts in the circumferential direction.

In addition, in the above embodiment, the diameter of the circle 15 is not limited to that illustrated in FIG. 8 or the like and it will be appreciated that the diameter may be changed depending on the requested performance or the like.

Although FIG. 15 illustrates the case in which the resistors R1 to R4 extend in a direction parallel to the straight line 22 as an example of the case in which the resistors R1 to R4 extend in the same direction, the invention is not limited to this example and the resistors R1 to R4 may extend in a direction parallel to the straight line 21.

Although the resistors R1 to R4 are rectangular in plan view in the embodiments described above, the invention is not limited to the embodiments. For example, they may be square in plan view.

DESCRIPTION OF REFERENCE NUMERALS AND SIGNS 100, 100A, 100B, 100C: pressure sensor; 1a, 1b: semiconductor chip; 1aA, 1bA: principal surface of semiconductor chip; 1aB, 1bB: back surface of semiconductor chip; 1aC, 1bC: thin-walled portion; 10, 10a: center of semiconductor chip; 2a, 2b, 2c, 2d: supporting member; 3: diaphragm; 3A: pressure receiving surface; 3B: supporting surface; 30: center of diaphragm; 4: housing; 4A: end portion of housing; 4B: inner wall of housing; 5, 6: seat; R1 to R4: resistor

The invention claimed is:
1. A pressure sensor comprising:
a diaphragm having a first principal surface receiving a pressure of a measurement target fluid and a second principal surface opposite to the first principal surface;

a first seat provided in an area of the second principal surface in which the diaphragm is deformed when a first pressure higher than a second pressure in the second principal surface is applied to the first principal surface, the first seat being disposed concentrically with the diaphragm in plan view and projecting from the second principal surface orthogonally;

a second seat provided in the area concentrically with the diaphragm in plan view and projecting from the second principal surface orthogonally, the second seat having a larger diameter than the first seat;

a first semiconductor chip having a first resistor and a second resistor on a first surface thereof, the first resistor and the second resistor being included in a strain gauge;

a second semiconductor chip having a third resistor and a fourth resistor on a first surface thereof, the third resistor and the fourth resistor being included in the strain gauge;

a first structural body provided orthogonally to the second principal surface, having one end thereof coupled to a part of the first seat, the part being disposed in a first straight line passing through a center of the second principal surface of the diaphragm in plan view, and another end thereof is coupled to a second surface of the first semiconductor chip;

a second structural body, provided orthogonally to the second principal surface, having one end thereof coupled to a part of the second seat, the part being disposed in the first straight line in plan view, and another end thereof is coupled to the second surface of the first semiconductor chip;

a third structural body, provided orthogonally to the second principal surface, having one end thereof coupled to a part of the first seat, the part being disposed in a second straight line passing through the center of the second principal surface and orthogonal to the first straight line in plan view and another end thereof is coupled to a second surface of the second semiconductor chip; and a fourth structural body, provided orthogonally to the second principal surface, having one end thereof coupled to a part of the second seat, the part being disposed in the second straight line in plan view, and another end thereof is coupled to the second surface of the second semiconductor chip, wherein the first resistor and the second resistor are formed in a first region between a first coupling surface to which the first structural body is coupled and a second coupling surface to which the second structural body is coupled in plan view in the first semiconductor chip, and the third resistor and the fourth resistor are formed in a second region between a third coupling surface to which the third structural body is coupled and a fourth coupling surface to which the fourth structural body is coupled in plan view in the second semiconductor chip.

2. The pressure sensor according to claim 1,
wherein the first semiconductor chip is formed in a rectangle and the first semiconductor chip is disposed so that a longer side thereof is parallel to the first straight line,
the second semiconductor chip is formed in a rectangle and the second semiconductor chip is disposed so that a longer side thereof is parallel to the second straight line,
the first resistor and the second resistor are disposed side by side in a direction parallel to a shorter side of the first semiconductor chip and extend in directions different from each other, and
the third resistor and the fourth resistor are disposed side by side in a direction parallel to a shorter side of the second semiconductor chip and extend in directions different from each other.

3. The pressure sensor according to claim 2,
wherein the first resistor and the fourth resistor extend in a same direction, and
the second resistor and the third resistor extend in a direction orthogonal to the same direction in which the first resistor and the fourth resistor extend.

4. The pressure sensor according to claim 2,
wherein the first resistor, the second resistor, the third resistor, and the fourth resistor are disposed equidistantly from the center of the second principal surface of the diaphragm.

5. The pressure sensor according to claim 1,
wherein the first semiconductor chip is formed in a rectangle and the first semiconductor chip is disposed so that a longer side thereof is parallel to the first straight line,
the second semiconductor chip is formed in a rectangle and the second semiconductor chip is disposed so that a longer side thereof is parallel to the second straight line,
the first resistor and the second resistor are disposed side by side in a direction parallel to the longer side of the first semiconductor chip, and
the third resistor and the fourth resistor are disposed side by side in a direction parallel to the longer side of the second semiconductor chip.

6. The pressure sensor according to claim 5,
wherein the first resistor, the second resistor, the third resistor, and the fourth resistor extend in the same direction.

7. The pressure sensor according to claim 5,
wherein the first resistor and the fourth resistor are disposed equidistantly from the center of the second principal surface of the diaphragm and the second resistor and the third resistor are disposed equidistantly from the center of the second principal surface of the diaphragm.

8. The pressure sensor according to claim 1,
wherein the first semiconductor chip has a first thin-walled portion thinner than regions to which the first structural body and the second structural body are coupled,
the second semiconductor chip has a second thin-walled portion thinner than regions to which the third structural body and the fourth structural body are coupled,
the first resistor and the second resistor are formed in the first region on the first surface of the first semiconductor chip, the first region corresponding to the first thin-walled portion, and
the third resistor and the fourth resistor are formed in the second region on the first surface of the second semiconductor chip, the second region corresponding to the second thin-walled portion.

* * * * *